(12) United States Patent
Weber et al.

(10) Patent No.: US 11,421,555 B2
(45) Date of Patent: Aug. 23, 2022

(54) CASE FLANGE WITH SCALLOP FEATURES

(71) Applicant: United Technologies Corporation, Farmington, CT (US)

(72) Inventors: Michael C. Weber, Niantic, CT (US); Konstantinos P. Giannakopoulos, Middletown, CT (US); Robert B. Fuller, Colchester, CT (US); Bill Nguyen, Middletown, CT (US); Alexei T. Marqueen, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 550 days.

(21) Appl. No.: 16/213,128

(22) Filed: Dec. 7, 2018

(65) Prior Publication Data
US 2020/0182091 A1 Jun. 11, 2020

(51) Int. Cl.
*F01D 25/24* (2006.01)
*F01D 25/28* (2006.01)

(52) U.S. Cl.
CPC .......... *F01D 25/243* (2013.01); *F01D 25/28* (2013.01); *F05D 2220/32* (2013.01)

(58) Field of Classification Search
CPC .................................................. F01D 25/243
See application file for complete search history.

(56) References Cited

U.S. PATENT DOCUMENTS

| 3,067,983 | A | * | 12/1962 | Koziura | ............... | F01D 25/24 |
| | | | | | | 415/209.2 |
| 6,283,712 | B1 | | 9/2001 | Dziech | | |
| 9,856,753 | B2 | | 1/2018 | Chow et al. | | |
| 9,957,896 | B2 | | 5/2018 | Belmonte et al. | | |
| 10,054,007 | B2 | | 8/2018 | Todorovic | | |
| 10,941,669 | B2 | * | 3/2021 | Hough | ................... | F01D 25/125 |
| 2010/0316484 | A1 | | 12/2010 | Jasko | | |
| 2013/0323077 | A1 | * | 12/2013 | Giannakopoulos | ... | F04D 29/321 |
| | | | | | | 416/93 R |
| 2014/0338165 | A1 | * | 11/2014 | Edwards | ............... | F01D 25/243 |
| | | | | | | 29/252 |

(Continued)

FOREIGN PATENT DOCUMENTS

| EP | 2278125 | A2 | * | 1/2011 | ............... | F01D 9/02 |
| WO | WO-2015157751 | A1 | * | 10/2015 | ............. | F01D 25/24 |

OTHER PUBLICATIONS

EP search report for EP19201795.2 dated Mar. 31, 2020.
EP Office Action for EP19201795.2 dated Jun. 10, 2021.

*Primary Examiner* — Todd E Manahan
*Assistant Examiner* — Rodolphe Andre Chabreyrie
(74) *Attorney, Agent, or Firm* — Getz Balich LLC

(57) ABSTRACT

A flange includes a flange body and a scallop feature. The flange body is annularly disposed about a longitudinal axis. The flange body includes a first radial side and a second radial side radially opposite the first radial side. The flange body defines a first fastener hole and a circumferentially adjacent second fastener hole. Each of the first fastener hole and the second fastener hole are formed through the flange body. The scallop feature is formed through the flange body and disposed circumferentially between the first and second fastener holes. The scallop feature extends radially from the first radial side through at least a portion of the flange body. The scallop feature includes a first side and a second side, parallel to the first side.

17 Claims, 5 Drawing Sheets

(56) References Cited

U.S. PATENT DOCUMENTS

| | | | |
|---|---|---|---|
| 2015/0040395 A1* | 2/2015 | Delapierre | F01D 5/3092 |
| | | | 29/889.1 |
| 2015/0143816 A1 | 5/2015 | Salunkhe et al. | |
| 2016/0281541 A1 | 9/2016 | Monteiro | |
| 2016/0363004 A1* | 12/2016 | Chow | F01D 25/24 |
| 2017/0226894 A1 | 8/2017 | Ganiger | |
| 2018/0119614 A1* | 5/2018 | Scott | F02C 7/04 |
| 2018/0119616 A1* | 5/2018 | Scott | F02C 7/04 |
| 2018/0223691 A1 | 8/2018 | Dale | |
| 2018/0363816 A1* | 12/2018 | Ende | F16L 23/032 |

\* cited by examiner

CASE FLANGE WITH SCALLOP FEATURES

This invention was made with Government support awarded by the United States. The Government has certain rights in this invention.

BACKGROUND

1. Technical Field

This disclosure relates generally to aircraft gas turbine engine flanges, and more particularly to flange stress-reduction features.

2. Background Information

Flanges for gas turbine engines can be used to attach cases of various engine components, for example, an outer diffuser case and high-pressure turbine case. These flanges are often subject to external loads, large pressure variations, and thermal gradients, which may cause high levels of stress (e.g., hoop stress) in portions of the flange resulting in reduction of operational life. As a result, meeting product life requirements for these flanges may present a significant challenge.

Addressing the stresses applied to flanges has become more difficult as a result of the increasing thrust requirements of modern gas turbine engines. As thrust requirements increase, the need to keep flanges tight under higher loading becomes more challenging. Accordingly, space between flange fasteners has decreased in an effort to maintain flange tightness, thereby limiting options for flange stress reduction. Further, gas turbine engine space and weight considerations may make increasing the thickness of flanges, to address stresses, impractical.

SUMMARY

According to an embodiment of the present disclosure, a flange includes a flange body and a scallop feature. The flange body is annularly disposed about a longitudinal axis. The flange body includes a first radial side and a second radial side radially opposite the first radial side. The flange body defines a first fastener hole and a circumferentially adjacent second fastener hole. Each of the first fastener hole and the second fastener hole are formed through the flange body. The scallop feature is formed through the flange body and disposed circumferentially between the first and second fastener holes. The scallop feature extends radially from the first radial side through at least a portion of the flange body. The scallop feature includes a first side and a second side, parallel to the first side.

In the alternative or additionally thereto, in the foregoing embodiment, the first and second sides have a radial orientation.

In the alternative or additionally thereto, in the foregoing embodiment, a length of the first and second sides is greater than one-half of a radial length of the scallop feature.

In the alternative or additionally thereto, in the foregoing embodiment, the scallop feature extends radially from the first radial side to a fastener diameter of at least one of the first and second fastener holes.

In the alternative or additionally thereto, in the foregoing embodiment, the scallop feature extends circumferentially between a fastener diameter of each of the first and second fastener holes.

In the alternative or additionally thereto, in the foregoing embodiment, the first radial side is a radially inward side of the flange.

In the alternative or additionally thereto, in the foregoing embodiment, the first radial side is a radially outward side of the flange.

In the alternative or additionally thereto, in the foregoing embodiment, the scallop feature is configured to reduce a stress of the flange body proximate an outer diameter of each of the first and second fastener holes.

In the alternative or additionally thereto, in the foregoing embodiment, the stress is induced by at least one of a pressure differential and a thermal gradient across the flange body.

In the alternative or additionally thereto, in the foregoing embodiment, the thermal gradient extends radially from an inner radial side of the flange body to an outer radial side of the flange body.

According to another embodiment of the present disclosure, a case includes a flange. The flange includes a flange body and at least one scallop feature. The flange body is annularly disposed about a longitudinal axis. The flange body includes a first radial side and a second radial side radially opposite the first radial side. The flange body defines a plurality of fastener holes. The plurality of fastener holes are formed through the flange body. Each scallop feature of the at least one scallop feature is formed through the flange body and disposed circumferentially between each pair of adjacent fastener holes of the plurality of fastener holes. The at least one scallop feature extends radially from the first radial side through at least a portion of the flange body. The at least one scallop feature includes a first side and a second side, parallel to the first side.

In the alternative or additionally thereto, in the foregoing embodiment, the first and second sides have a radial orientation.

In the alternative or additionally thereto, in the foregoing embodiment, a length of the first and second sides is greater than one-half of a radial length of each scallop feature of the at least one scallop feature.

In the alternative or additionally thereto, in the foregoing embodiment, the at least one scallop feature extends radially from the first radial side to a fastener diameter of at least one of the first and second fastener holes.

In the alternative or additionally thereto, in the foregoing embodiment, the at least one scallop feature extends circumferentially between a fastener diameter of each of the first and second fastener holes.

According to another embodiment of the present disclosure, a gas turbine engine includes a case and a flange in communication with the case. The flange includes a flange body and a scallop feature. The flange body is annularly disposed about a longitudinal axis. The flange body includes a first radial side and a second radial side radially opposite the first radial side. The flange body defines a first fastener hole and a circumferentially adjacent second fastener hole. Each of the first fastener hole and the second fastener hole are formed through the flange body. The scallop feature is formed through the flange body and disposed circumferentially between the first and second fastener holes. The scallop feature extends radially from the first radial side through at least a portion of the flange body. The scallop feature has a first side and a second side, parallel to the first side.

In the alternative or additionally thereto, in the foregoing embodiment, the first and second sides have a radial orientation.

In the alternative or additionally thereto, in the foregoing embodiment, a length of the first and second sides is greater than one-half of a radial length of the scallop feature.

In the alternative or additionally thereto, in the foregoing embodiment, the scallop feature extends radially from the first radial side to a fastener diameter of at least one of the first and second fastener holes.

In the alternative or additionally thereto, in the foregoing embodiment, the scallop feature extends circumferentially between a fastener diameter of each of the first and second fastener holes.

The present disclosure, and all its aspects, embodiments and advantages associated therewith will become more readily apparent in view of the detailed description provided below, including the accompanying drawings.

DETAILED DESCRIPTION

Figure 1:
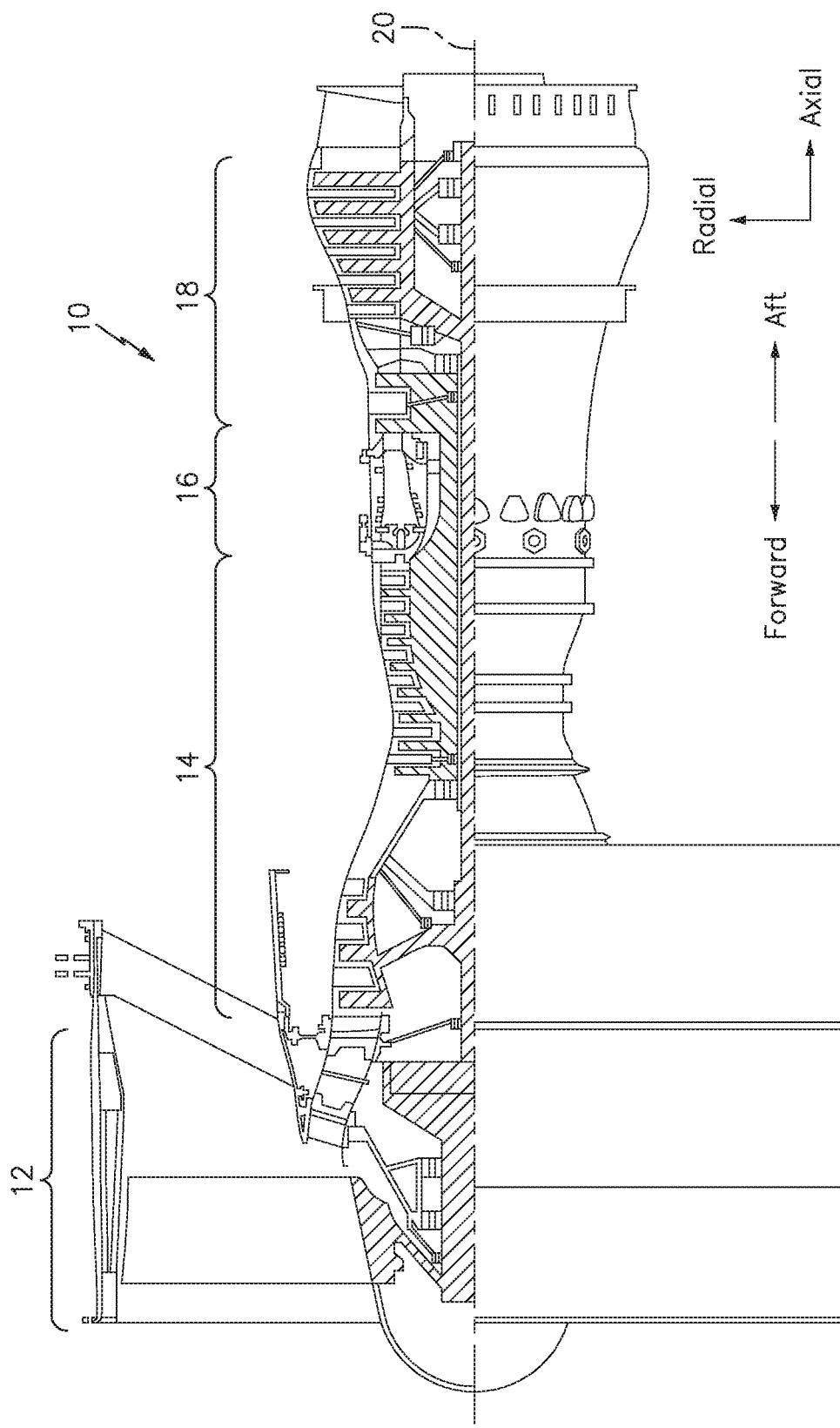
FIG. 1 is a schematic cross-section of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

FIG. 1 schematically illustrates a gas turbine engine 10. The gas turbine engine 10 generally includes a fan section 12, a compressor section 14, a combustor section 16, and a turbine section 18 disposed about a longitudinal axis 20 (e.g., a longitudinal centerline of the gas turbine engine 10). The fan section 12 drives air along a bypass flowpath while the compressor section 14 drives air along a core flowpath for compression and communication into the combustor section 16. The compressed air is heated by the combustor section 16 to generate a high-pressure exhaust gas stream that expands through the turbine section 18. The turbine section 18 extracts energy from the high-pressure exhaust gas stream to drive the fan section 12 and the compressor section 14. Although depicted as a turbofan in the disclosed non-limiting embodiment, it should be understood that the concepts described herein are not limited to use with turbofans as the teachings may be applied to other types of turbine engines.

Figure 2:
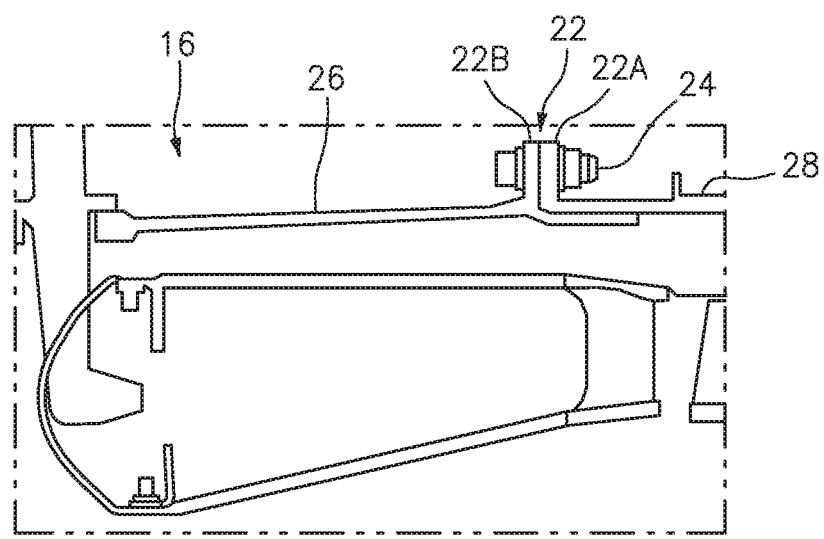
FIG. 2 is a cross-section of a combustor section of the gas turbine engine of FIG. 1.

Referring to FIGS. 1 and 2, components of the gas turbine engine 10, including but not limited to the fan section 12, the compressor section 14, the combustor section 16, the turbine section 18, or parts of the preceding components can be assembled together with bolted flanges. In certain embodiments, component cases can include flanges to allow connection and assembly thereof. For example, in the illustrated embodiment, the flange 22 is used to assemble an outer diffuser case 26 with the high-pressure turbine case 28. The disclosed embodiments, however, are not limited to flanges used for assembly of static cases and frames and may be applicable to other flanges, for example, rotor flanges.

The flange 22 may be used to provide mating surfaces to connect a component case to another component. In the illustrated embodiment, the flange 22 includes a first flange 22A and a second flange 22B. Flange fasteners 24 (e.g., bolts) may be used to connect the first flange 22A and the second flange 22B. FIG. 2 depicts a flanges 22A, 22B having an outer diameter fastening configuration (i.e., the flanges 22A, 22B are disposed radially outward of their respective cases). The disclosed embodiments, however, may also be applicable for flanges having an inner diameter fastening configuration (i.e., the flanges are disposed radially inward of their respective cases).

During operation of the gas turbine engine 10, heat may be transferred from gas turbine engine 10 components (e.g., a combustor or high-pressure turbine) and component case to the flange 22 creating a thermal gradient across the flange 22. In certain applications, the thermal gradient can create thermal stress in certain portions of the flange 22.

Figure 3:
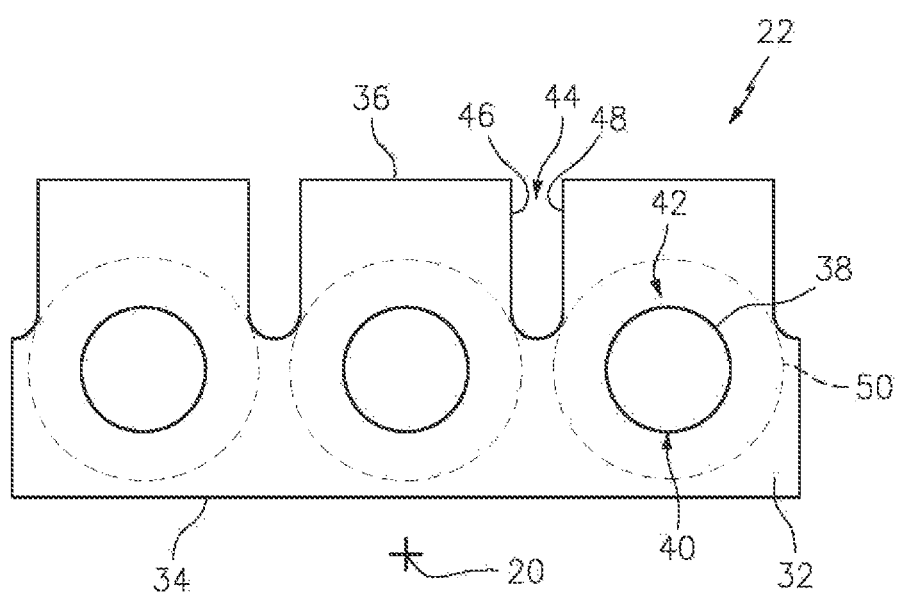
FIG. 3 is a partial, front view of an exemplary flange.

Referring to FIGS. 2 and 3, a portion of flange 22 is shown. The flange 22 generally includes a flange body 32 annularly disposed about the longitudinal axis 20 and having an inner radial side 34 and an outer radial side 36. A plurality of fastener holes 38 are formed through the flange body 32 (e.g., in an axial direction with respect to the longitudinal axis 20) and configured to receive the flange fasteners 24. Each fastener hole 38 includes an inner diameter 40 (i.e., the radially innermost portion of the fastener hole 38) and an outer diameter 42 (i.e., the radially outermost portion of the fastener hole 38). Each fastener hole 38 and corresponding flange fastener 24 also includes a fastener diameter 50 defined by a perimeter of a mounting face of the flange fastener 24 (i.e., the face of a head or nut of the flange fastener 24 abutting a face of the flange 22).

The flange body 32 can have any suitable thickness and be formed from any suitable material. In the illustrated embodiment, the flange body 32 is generally circular or hoop shaped. The plurality of fastener holes 38 and associated flange fasteners 24 may be used to provide a suitable coupling force needed for operation and assembly between associated flanges/cases (e.g., flanges 22A, 22B of FIG. 2). The fastener holes 38 may be disposed in a circumferential arrangement around the flange body 32. In the illustrated embodiment, the flange 22 may be associated with, affixed to, or otherwise coupled to a case 100 (e.g., cases 26, 28 of FIG. 2). In certain embodiments, the flange 22 may be integrally formed with the case 100. The case 100 can be any suitable component case, including but not limited to, the outer diffuser case 26, the high-pressure turbine case 28, etc. In some embodiments, the flange 22 may function as, for example, a bearing compartment flange or any other flange in a gas turbine engine 10.

During operation, heat generating components, such as components in the combustor section 16 or the turbine section 18, etc., can transfer heat into the flange body 32. Due to the proximity of the inner radial side 34 of the flange 22 to heat generating components, the portion of the flange body 32 proximate the inner radial side 34 may heat up more than the portion of the flange body 32 proximate the outer radial side 36, creating a thermal gradient across the flange body 32. In the illustrated embodiment, the thermal gradient extends in a generally radially outward direction (e.g., from the inner radial side 34 to the outer radial side 36), with hotter temperatures near the inner radial side 34 and cooler temperatures near the outer radial side 36. In certain embodiments, the thermal gradient can be affected by the ambient airflow proximate the outer radial side 36 of the flange 22.

Due to thermal gradient experienced across the flange body 32, various portions of the flange body 32 can experience different temperatures at a given time. Various portions of the flange body 32 can expand at different rates in response to the difference in temperatures across the thermal gradient. As one of ordinary skill in the art will appreciate, if portions of the flange body 32 are constrained during thermal expansion and contraction, the flange body 32 can experience stress, including but not limited to, increased hoop (i.e., circumferential) stress. Stress across the flange body 32 may also be applied by other forces, for example, stress caused by a pressure differential across the flange body 32.

Figure 3A:
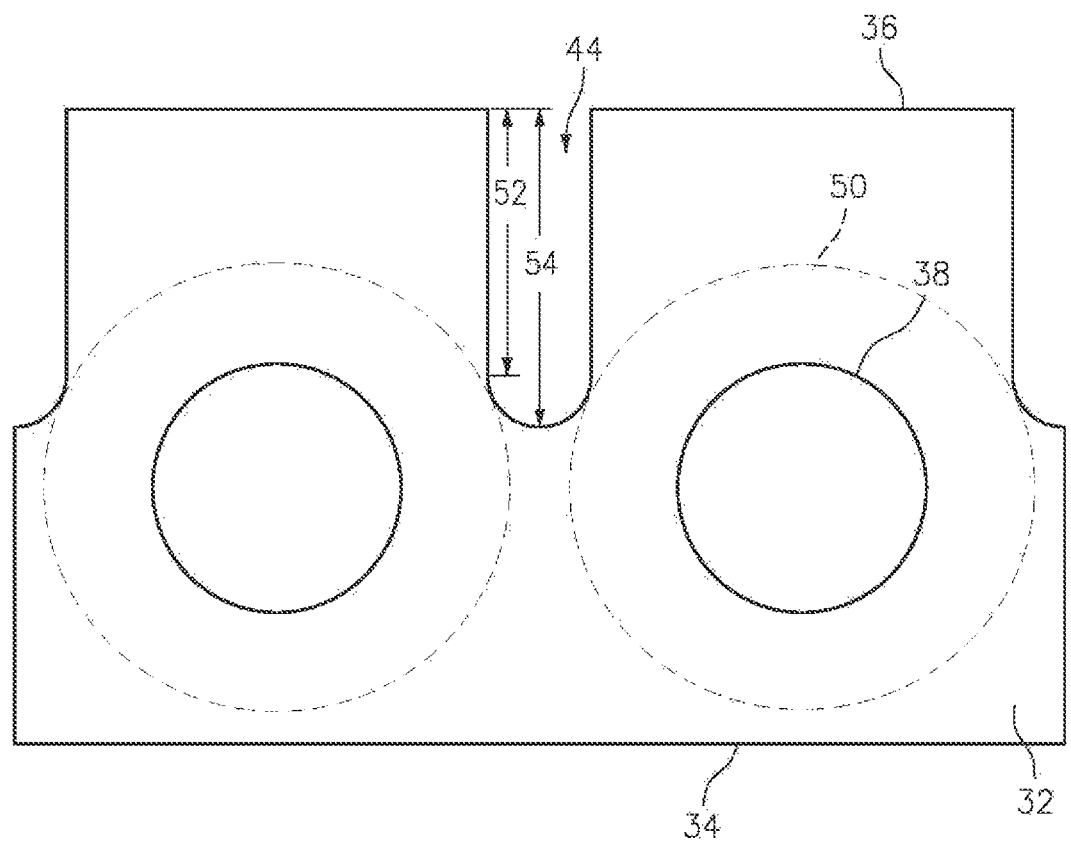
FIG. 3A is another front view of the flange of FIG. 3.

Referring to FIGS. 3 and 3A, the flange 22 includes at least one scallop feature 44 formed through the flange body 32 and disposed between circumferentially adjacent fastener holes of the plurality of fastener holes 38. The at least one scallop feature 44 is configured to reduce a stress of the flange body 32 caused by, for example, a thermal gradient, pressure differential, etc. across the flange body 32 by removing material from high hoop-stress areas. As one of ordinary skill in the art will appreciate, the at least one scallop feature 44 is further configured to reduce a stress of the flange body 32 without interfering with the cone of compression of the plurality of fastener holes 38 and associated flange fasteners 24. For example, in the illustrated embodiment, the at least one scallop feature 44 may reduce a stress of the flange body 32 proximate an outer diameter 42 of the each of the adjacent fastener holes of the plurality of fastener holes 38.

In the illustrated embodiment, the at least one scallop feature 44 extends radially from the outer radial side 36 through at least a portion of the flange body 32. For example, the at least one scallop feature 44 may extend radially from the outer radial side 36 to a fastener diameter 50 of at least one of the circumferentially adjacent fastener holes of the plurality of fastener holes 38. The at least one scallop feature 44 may also extend circumferentially between the fastener diameters 50 of the circumferentially adjacent fastener holes of the plurality of fastener holes 38. While the at least one scallop feature 44 is described herein as extending from the outer radial side 36 of the flange 22, in some embodiments the at least one scallop feature 44 may extend from the inner radial side 34 of the flange 22 (e.g., for a flange extending radially inward from a case).

The at least one scallop feature 44 includes a first side 46 and a second side 48, parallel to the first side 46. The first side 46 and the second side 48 may be oriented generally radially. The first side 46 and the second side 48 have a length 52. For example, in some embodiments, the length 52 of the first and second sides 46, 48 may extend from the outer radial side 36 to the fastener diameter 50 of at least one of the circumferentially adjacent fastener holes of the plurality of fastener holes 38. In some embodiments, the length 52 of the first and second sides 46, 48 may be a portion of a radial length 54 of the at least one scallop feature 44. For example, in some embodiments, the length 52 of the first and second sides 46, 48 may be greater than one-tenth, one-quarter, one-half, etc. of the radial length 54 of the at least one scallop feature 44. In some other embodiments, the first and second sides 46, 48 may have different lengths.

Figure 4:
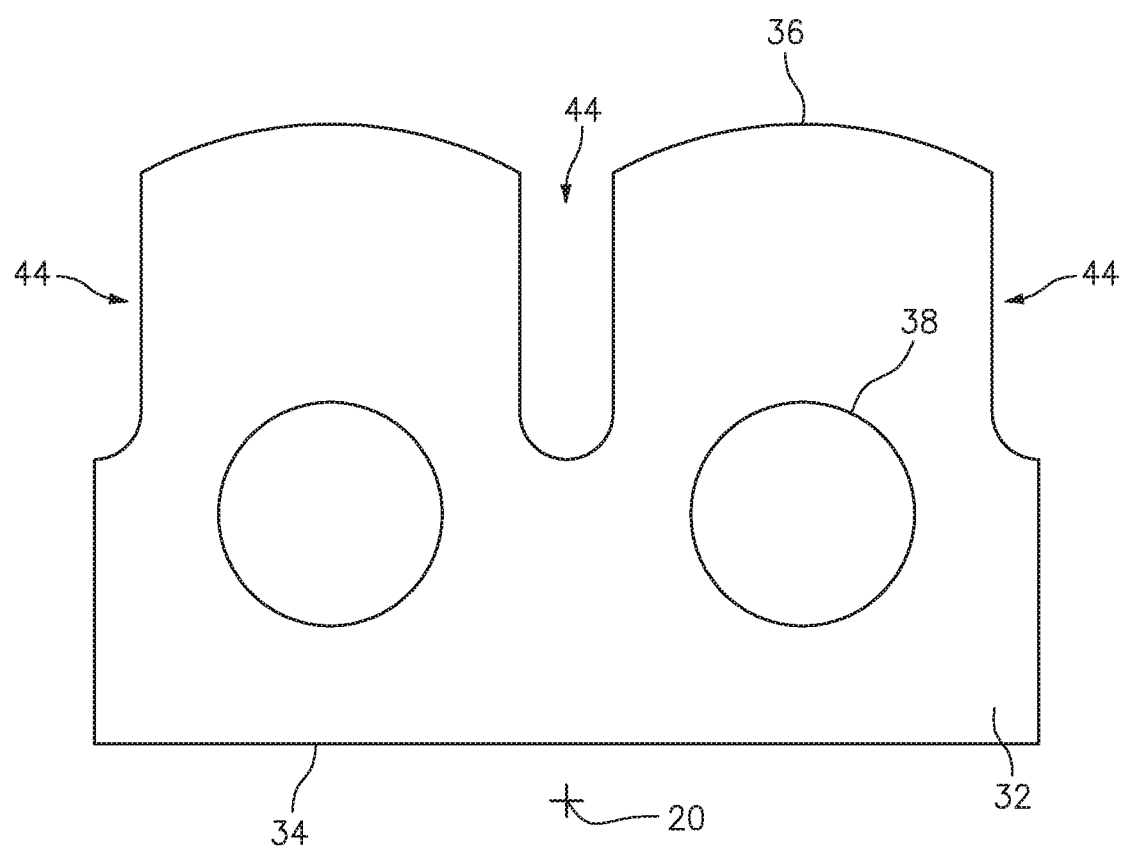
FIG. 4 is a partial, front view of an exemplary flange.

Referring to FIG. 4, another embodiment of the flange 22 is shown. In the illustrated embodiment, the flange 22 includes an outer radial side 36 having a contoured shape (e.g., a generally rounded shape that is not parallel to the corresponding inner radial side 34) between adjacent scallop features of the at least one scallop feature 44. The contoured shape of the outer radial side 36 may provide a reduction of flange 22 weight as a result of reduced flange 22 material. In some alternative embodiments, the inner radial side 34 may have a contoured shape similar to that of the outer radial side 36 as illustrated in FIG. 4, for example, where the at least one scallop feature 44 extends from the inner radial side 34.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A flange comprising:
a flange body annularly disposed about a longitudinal axis, the flange body comprising a first radial side and a second radial side radially opposite the first radial side, the flange body defining a plurality of circumferentially adjacent fastener holes, each fastener hole of the plurality of fastener holes formed through the flange body; and
a plurality of scallop features formed through the flange body and disposed circumferentially between each pair of adjacent fastener holes of the plurality of fastener holes, each scallop feature of the plurality of scallop features extending radially from the first radial side through at least a portion of the flange body;
wherein each scallop feature comprises a first side and a second side, parallel to the first side; and
wherein the first radial side has a contoured shape between each pair of adjacent scallop features of the plurality of scallop features and wherein the contoured shape is not parallel to the second radial side.

2. The flange of claim 1, wherein the first and second sides have a radial orientation.

3. The flange of claim 1, wherein a length of the first and second sides is greater than one-half of a radial length of each scallop feature.

4. The flange of claim 1, wherein each scallop feature extends radially from the first radial side to fastener diameters of each fastener hole of the respective pair of adjacent fastener holes.

5. The flange of claim 1, wherein each scallop feature extends circumferentially between fastener diameters of each fastener hole of the respective pair of adjacent fastener holes.

6. The flange of claim 1, wherein the first radial side is a radially inward side of the flange.

7. The flange of claim 1, wherein the first radial side is a radially outward side of the flange.

8. The flange of claim 1, wherein each scallop feature is configured to reduce a stress of the flange body proximate an outer diameter of each fastener hole of the respective pair of adjacent fastener holes.

9. The flange of claim 8, wherein the stress is induced by at least one of a pressure differential and a thermal gradient across the flange body.

10. The flange of claim 9, wherein the thermal gradient extends radially from an inner radial side of the flange body to an outer radial side of the flange body.

11. The flange of claim 1, wherein the contoured shape includes a first circumferential end, a second circumferential end, and a circumferential mid-point between the first circumferential end and the second circumferential end and wherein the circumferential midpoint is a first radial distance from the second radial side which is greater than respective second radial distances of the first circumferential end and the second circumferential end from the second radial side.

12. A gas turbine engine comprising:
   a case; and
   a flange in communication with the case, the flange comprising:
      a flange body annularly disposed about a longitudinal axis, the flange body comprising a first radial side and a second radial side radially opposite the first radial side, the flange body defining a plurality of circumferentially adjacent fastener holes, each fastener hole of the plurality of fastener holes formed through the flange body; and
      a plurality of scallop features formed through the flange body and disposed circumferentially between each pair of adjacent fastener holes of the plurality of fastener holes, each scallop feature of the plurality of scallop features extending radially from the first radial side through at least a portion of the flange body;
   wherein each scallop feature comprises a first side and a second side, parallel to the first side; and
   wherein the first radial side has a contoured shape between each pair of adjacent scallop features of the plurality of scallop features and wherein the contoured shape is not parallel to the second radial side.

13. The gas turbine engine of claim 12, wherein the first and second sides have a radial orientation.

14. The gas turbine engine of claim 12, wherein a length of the first and second sides is greater than one-half of a radial length of each scallop feature.

15. The gas turbine engine of claim 12, wherein each scallop feature extends radially from the first radial side to fastener diameters of each fastener hole of the respective pair of adjacent fastener holes.

16. The gas turbine engine of claim 12, wherein each scallop feature extends circumferentially between fastener diameters of each fastener hole of the respective pair of adjacent fastener holes.

17. A flange comprising:
   a flange body annularly disposed about a longitudinal axis, the flange body comprising a first radial side and a second radial side radially opposite the first radial side, the flange body defining a plurality of circumferentially spaced fastener holes, each fastener hole of the plurality of fastener holes formed through the flange body;
   a plurality of flange fasteners, each flange fastener of the plurality of flange fasteners disposed in a respective fastener hole of the plurality of fastener holes, each flange fastener including a fastener diameter defined by a perimeter of a mounting face of the respective flange fastener which abuts the flange body; and
   a plurality of scallop features formed through the flange body and disposed circumferentially between each pair of adjacent fastener holes of the plurality of fastener holes, each scallop feature of the plurality of scallop features extending radially through the flange body from the first radial side to and radially abutting fastener diameters of a respective pair of flange fasteners disposed in a respective pair of adjacent fastener holes and each scallop feature extending circumferentially from a first fastener diameter of a first flange fastener of the respective pair of flange fasteners to a second fastener diameter of a second flange fastener of the respective pair of flange fasteners;
   wherein each scallop feature comprises a first side and a second side, parallel to the first side; and
   wherein the first radial side has a contoured shape between each pair of adjacent scallop features of the plurality of scallop features.

\* \* \* \* \*